Oct. 9, 1956     S. O. HANSON     2,766,014
ICE AUGER HEAD

Filed April 29, 1954     2 Sheets-Sheet 1

*INVENTOR.*
SELMER O. HANSON
*BY*
Richard P. Cardew
AGENT

Oct. 9, 1956  S. O. HANSON  2,766,014
ICE AUGER HEAD
Filed April 29, 1954  2 Sheets-Sheet 2

INVENTOR.
SELMER O. HANSON
BY
Richard P. Cardew
AGENT

United States Patent Office 2,766,014
Patented Oct. 9, 1956

2,766,014

ICE AUGER HEAD

Selmer O. Hanson, Cloquet, Minn.

Application April 29, 1954, Serial No. 426,528

3 Claims. (Cl. 255—70)

This invention relates to a tool for boring holes in ice and has particular reference to such a tool for use by ice fishermen to bore a hole through the ice to permit fishing therethrough.

There has long been a search for an ice auger which would drill rapidly and efficiently through ice making a fishing hole. There have been several of these devices made and sold, however, none of them have come into common use because they are relatively ineffective when drilling. Most of the ice augers now on the market are quite expensive and out of reach of the average ice fisherman.

It is one of the principal objects of my invention to provide an ice auger which will drill a hole through ice rapidly and with a minimum of effort.

Another object is to provide such a device which is relatively inexpensive to manufacture and sell.

Another object is to provide such a device having a special and peculiar blade construction to affect maximum efficiency in the drilling operation.

These and other objects and advantages of my invention will become more apparent as the description proceeds.

In the accompanying drawing forming a part of this application:

Figure 2:
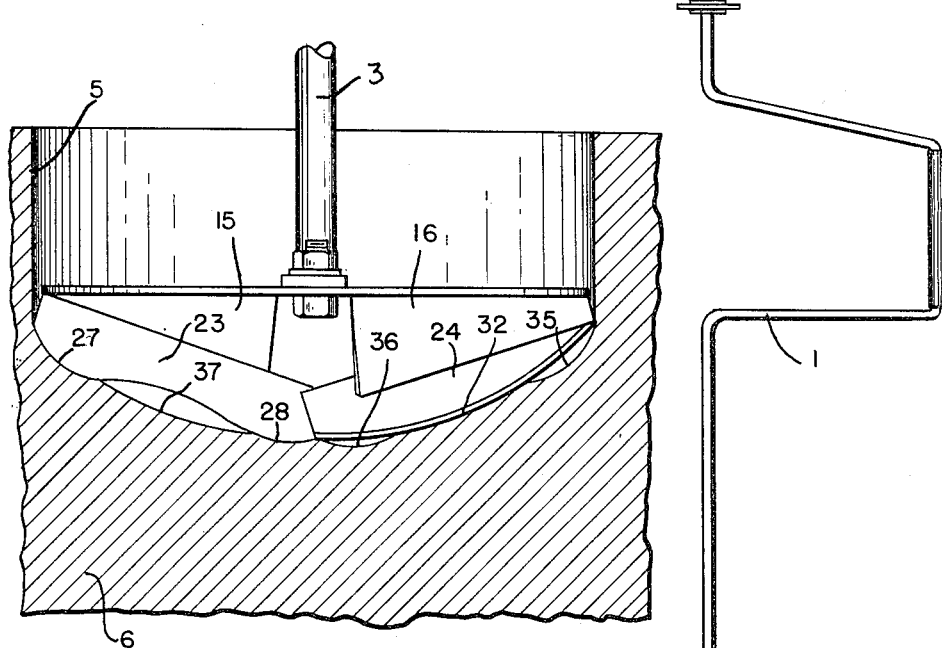
Fig. 2 is an enlarged elevational view of my device showing it in operating position.
Figure 6:
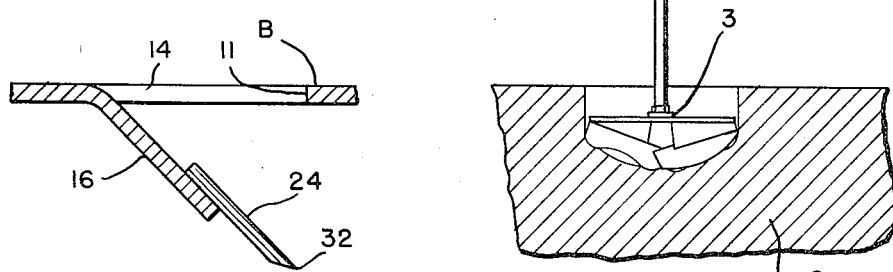
Fig. 6 is a sectional view on the line 6—6 of Fig. 4.
Figure 1:
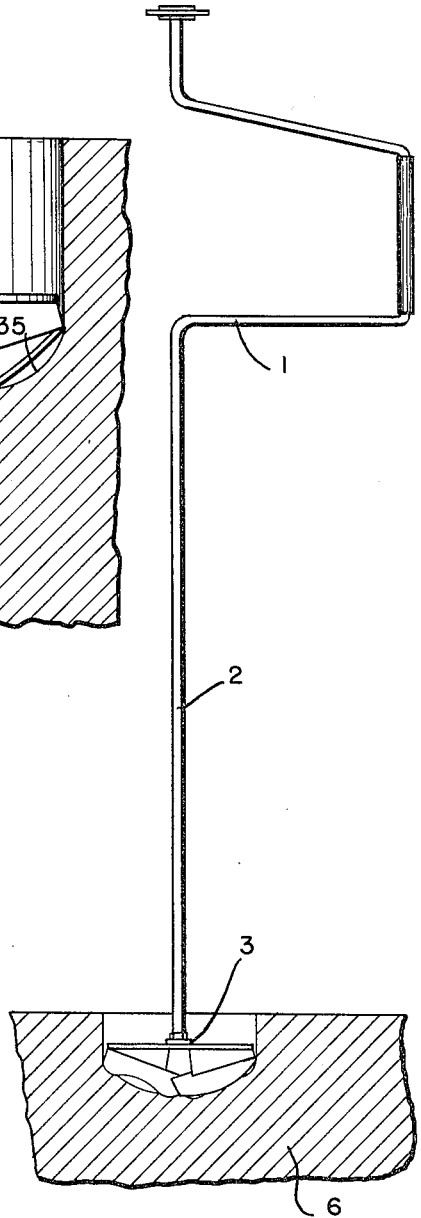
Fig. 1 is an elevational view of my device.
Figure 4:
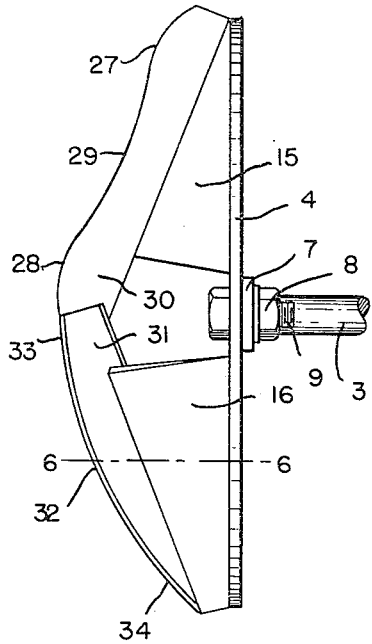
Fig. 4 is an end view of Fig. 3.
Figure 3:
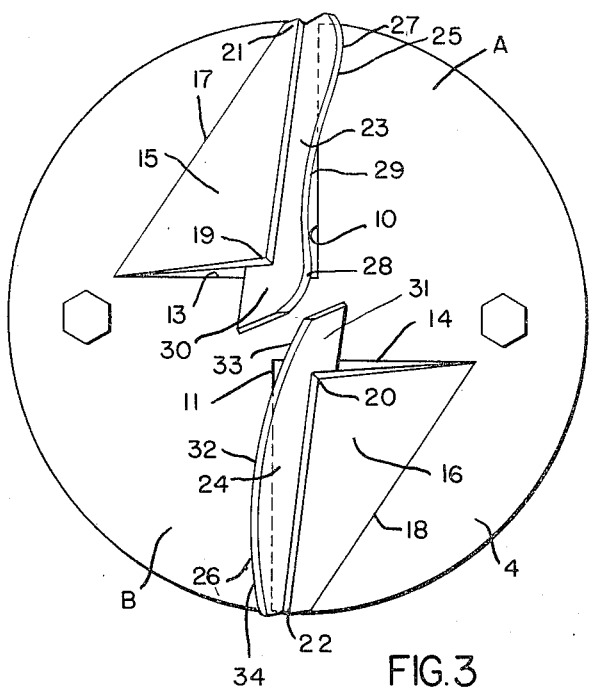
Fig. 3 is a bottom plan view of the auger head.

In the drawing the reference numeral 1 indicates the hand brace by means of which my ice auger may be rotated by hand to drill a hole through ice. The hand brace construction is old in the art and is deemed to need no further explanation here.

The hand brace has an elongated shaft 2 extending therefrom through which the auger head 3 is attached.

Figure 5:
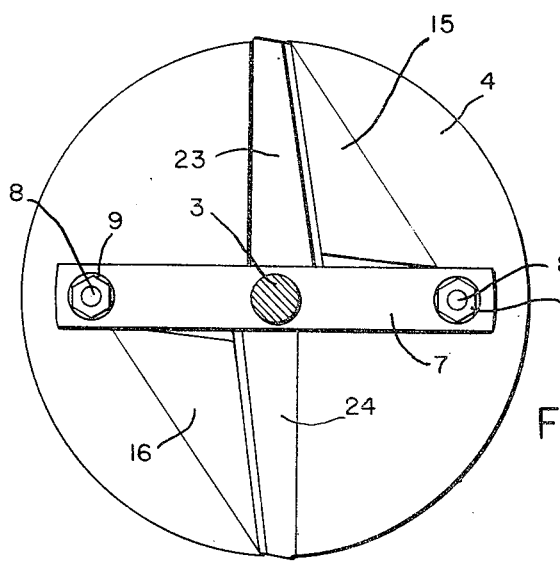
Fig. 5 is a top plan view of the auger head.

My auger head comprises: a central disc or plate 4 made of metal, the disc being of slightly less diameter than the diameter of the hole 5 to be drilled in the ice 6. The plate 4 is flat throughout its major portion, as shown, and is attached to shaft 2 by means of a cross arm 7 welded to the bottom end of the shaft 2, the cross arm 7 extending diametrically of the plate as shown in Fig. 5 and being bolted thereto as by bolts 8 and nuts 9 extending through the plate and the cross arm. The cross arm 7 is secured across the plate 4 substantially diametrically, thus the plate may be said to have two halves, A and B.

The disc or plate 4 of the auger head has two cuts 10 and 11 therein, the cuts extending from the opposed edges of the disc along substantially parallel lines but spaced from each other, the cuts 10 being in the half A of the disc and the cuts 11 being in the half B of the disc, as shown. Each of the halves A and B of the discs having a second cut, 13 and 14, respectively, therein extending from the inner edge of the cuts 10 and 11, respectively, and at right angles to their adjacent cuts as shown defining a blade carrying members 15 and 16, respectively, in the halves A and B of the disc. The blade carrying members 15 and 16 are between and along a diagonal line 17 and 18, respectively, defining a substantially triangular member in each of the halves A and B. The blade carrying members 15 and 16 are bent on the diagonal lines 17 and 18 as shown so that they may extend from the same side of the disc, namely the lower side thereof, and their innermost portions or ends 19 and 20, respectively, will extend furthest from the bottom surface of the disc or plate 4, and their outer ends 21 and 22 will lie closest to the disc or plate 4.

As shown in the drawings, the cuts 13 and 14 bisect an imaginary diametrical line extending through the disc between and parallel to the cuts 10 and 11 whereby it may be said that the blades 23 and 24, carried by the members 15 and 16, respectively, overlap a diametrical line extended between the blades.

The blades are preferably welded to their respective blade mounting members, and the blades are not of similar shape or contour along their cutting edges 25 and 26. The blade 23 has convex or outwardly curved portions 27 and 28 adjacent the outer and inner edges thereof and a concave or inwardly curved portion 29 substantially centrally thereof and between the raised portions 27 and 28 as shown. The blade 23 extends beyond the innermost end 19 of the member 15 as at 30 and the blade 24 extends beyond the member 16 as at 31 whereby the blades will cut to the center of a hole to be made in the ice 6, see Fig. 2.

The blade 24 has a single substantially uniform convex contour whereby the center portion 32 is the highest point and the end portions 33 and 34 are the lowest points of its cutting edges.

The above described auger head cuts very efficiently in ice, and as is clearly shown in Fig. 2, the convex portions 27 and 28 of the blade 23 cut the outer edge and center of the hole 5, and the convex portion 32 of the blade 24 reams out or cuts out the intermediate portion of the hole between the grooves 35 and 36 cut by the portions 27 and 28, respectively. In this manner an annular groove 37 is provided in the hole by the convex portion 32 of blade 24 as the auger head rotates and the cutting portions 27 and 28 of blade 23 cut ice from adjacent each side of the annular groove 37 as the auger head rotates.

This arrangement provides a balanced cutting action and the cutting operation does not require as much effort to accomplish the drilling operation as it does when a straight-faced cutter or a soft-toothed cutter might be used. My cutters, as above described, will drill a hole in ice much faster than any hand-operated drilling or chiseling device for a similar purpose in spite of the fact that it takes materially less effort to operate it.

Having thus described my invention, what I claim is:

1. An auger head for an ice drilling device comprising: a disc-like head, means for rotating said head, a pair of opposed substantially triangularly shape blade carrying members extending in angular relation to said head with the point of said carrying members which is furthest from said head being adjacent the center of said head, a blade carried by each of said blade carrying members, each of said blades having a cutting edge, the cutting edge of the first one of said blades comprising two widely spaced convex portions of substantially the same contour, one of said convex portions serving to cut the outer edge of an opening to be made by said auger head, said spaced convex portions being separated by a concave portion, the cutting edge of the other of said blades comprising a single substantially uniformly convex portion arranged so as to cut intermediate the cuttings made by said convex portions of the said first one of said blades.

2. An auger head for an ice drilling device comprising: an axially rotatable head, a pair of opposed blade mounting members extending in angular relation to said head and to each other with the point of said mounting members which is furthest from said head being toward the center of said head, a blade carried by each of said blade mounting members, each of said blades being of the same size and having a cutting edge, the cutting edge of one of said blades including two spaced convex portions and a concave portion between said two convex portions, the cutting edge of the other of said blades having a single convex portion arranged so as to cut intermediate the cuttings made by said convex portions of the said first one of said blades when said head is axially rotated.

3. An auger head for an ice drilling device comprising: an axially rotatable head, a pair of opposed blade carrying members extending from said head, said members being disposed in angular relation to said head with the point of said members which is furthest from said head being toward the center of said head, a blade on each of said members, each of said blades having a cutting edge, said edges being arranged substantially diametrically of said head, the cutting edge of the first one of said blades including two spaced convex portions, said spaced convex portions being separated by a concave portion, the cutting edge of the other of said blades comprising a convex portion arranged so as to cut intermediate the cuttings made by said convex portions of the first said one of said blades as said head is axially rotated.

References Cited in the file of this patent

UNITED STATES PATENTS

| | | |
|---|---|---|
| 291,977 | Brown | Jan. 15, 1884 |
| 1,065,005 | Skeen | June 13, 1913 |
| 1,172,065 | Sletten et al. | Feb. 15, 1916 |
| 1,486,898 | Hundrieser | Mar. 18, 1924 |